US012782230B2

(12) United States Patent
Rais et al.

(10) Patent No.: US 12,782,230 B2

(45) Date of Patent: Nov. 3, 2026

(54) METHOD FOR MEASURING VIBRATIONS OF A VIBRATION MACHINE

(71) Applicant: SANDVIK ROCK PROCESSING AUSTRALIA PTY LIMITED, North Ryde (AU)

(72) Inventors: Viktor Rais, Darmstadt (DE); Jan Schafer, Darmstadt (DE)

(73) Assignee: Sandvik Rock Processing Australia Pty Limited, New South Wales (AU)

(*) Notice: Subject to any disclaimer, the term of this patent is extended or adjusted under 35 U.S.C. 154(b) by 253 days.

(21) Appl. No.: 18/713,847

(22) PCT Filed: Nov. 28, 2022

(86) PCT No.: PCT/EP2022/083549

§ 371 (c)(1),
(2) Date: May 28, 2024

(87) PCT Pub. No.: WO2023/094675

PCT Pub. Date: Jun. 1, 2023

(65) Prior Publication Data

US 2025/0027836 A1 Jan. 23, 2025

(30) Foreign Application Priority Data

Nov. 29, 2021 (DE) ......................... 102021131189.6

(51) Int. Cl.
*G01B 11/27* (2006.01)
*G01M 7/02* (2006.01)

(52) U.S. Cl.
CPC .................................. *G01M 7/025* (2013.01)

(58) Field of Classification Search
None
See application file for complete search history.

(56) References Cited

U.S. PATENT DOCUMENTS

2020/0240870 A1* 7/2020 Schaefer ............... G01M 7/025

FOREIGN PATENT DOCUMENTS

| | | | | | |
|---|---|---|---|---|---|
| DE | 102009031268 | A1 | | 1/2011 | |
| DE | 102012014277 | A1 | | 2/2013 | |
| DE | 102017009373 | B3 | | 5/2019 | |
| EP | 2320203 | A1 | * | 5/2011 | ........... G01B 11/272 |
| WO | 2018087274 | A1 | | 5/2018 | |

* cited by examiner

*Primary Examiner* — Eric S. McCall
*Assistant Examiner* — Nigel H Plumb
(74) *Attorney, Agent, or Firm* — Corinne R. Gorski

(57) ABSTRACT

A method in which vibrations of a vibration machine, more particularly of a vibrating screen and a vibratory conveyor, are measured by a vibration sensor during operation. The vibration sensor measures vibration components of the vibrations of the vibration machine in three spatial directions of a Cartesian sensor coordinate system. The three vibration components form a vibration vector. In the vibration measurement processes, a gravity vector describing the direction of gravity is determined. Furthermore, a machine vector describing a preferred direction of a forced vibration of the vibration machine is determined. In addition, a three-dimensional Cartesian measurement coordinate system is formed, which is oriented on the basis of the direction of gravity and the preferred direction. The vibration vector is mapped from the sensor coordinate system to the measurement coordinate system.

10 Claims, 6 Drawing Sheets

METHOD FOR MEASURING VIBRATIONS OF A VIBRATION MACHINE

RELATED APPLICATION DATA

This application is a § 371 National Stage Application of PCT International Application No. PCT/EP2022/083549 filed Nov. 28, 2022 with priority to DE 10 2021 131 189.6 filed Nov. 29, 2021.

TECHNICAL FIELD

The present invention relates to methods for measuring vibrations of a vibrating machine.

BACKGROUND

Machines which have a vibration unit can, if the vibration of the vibration unit is the same or similar to the natural frequency of the machine, be damaged by the self-generated vibration. Due to the periodic excitation, more and more energy is transferred to the system. This constructive interference stores energy in the system until a resonance catastrophe occurs. In the worst case, this can destroy the machine.

Such resonance catastrophes first become noticeable through deformations of the machine. A deformation is the undesired change of certain reference points in relation to each other on the machine. This can be, for example, compression, stretching or twisting. Deformations can also occur independently of the natural frequency if, for example, the machine is subjected to a heavy load on one side and/or the machine is used for purposes for which it was not or only inadequately designed.

The vibrations can be desired movements of the vibrating machine as a whole (translation) or undesired deformations of the vibrating machine.

It is difficult to measure such deformations as they can be concealed in the overall vibration of the machine.

Until now, attempts have been made to make such deformations visible using so-called "stroke cards". These "stroke cards" are attached to corners and edges of the machine and then a line is drawn on these "stroke cards" by hand during operation. The vibrations of the machine can then be approximately determined using the drawn line.

It is also known to use stroboscopes, which cast a rapidly flickering light on the machine and "freeze" movements of the machine if the frequency is chosen appropriately. This allows any deformations to be observed visually. One disadvantage here is the measurement of such a visual observation. Furthermore, deformations of a vibrating machine in the millimeter range are to be expected. With a machine that is several meters in size, deformations can easily be overlooked. Furthermore, many parts of the machine are difficult or impossible to reach, so that deformations can also be overlooked here.

Furthermore, systems are known in which vibration sensors are attached to the vibrating machine. An evaluation unit then receives the data from the vibration sensors and can determine the vibration and resonance behavior of the vibrating machine by analyzing the measured vibrations. Typical vibration sensors here are acceleration sensors. One problem here is the complex calibration of the vibration sensors with each other. In order for the evaluation unit to draw the correct conclusions, the measured vibrations of the individual vibration sensors must be related to each other. To do this, the distance between the individual vibration sensors and the orientation of the vibration sensors in relation to each other must be known. Until now, these parameters have been measured manually.

DE 10 2017 009 373 B3 describes a mobile device for recording the status and operating parameters of vibrating machines.

Furthermore, DE 10 2012 014 277 A1 discloses a mobile device for detecting vibrations on a machine with rotating machine elements, in which the spatial orientation of the sensor measurement direction during a vibration measurement can be detected by means of a gyroscope and, accordingly, the vibration measurement can be assigned to the spatial orientation of the sensor.

SUMMARY

It is an object of the present invention to calibrate the orientation of vibration sensors in relation to each other simply and quickly.

It is a further object of the present invention to measure vibrations of a vibrating machine simply, accurately and repeatably during operation.

One or more objects are solved by the subject-matter of the present disclosure. Advantageous further embodiments and preferred embodiments form the subject-matter of the present disclosure.

In one method, a vibration sensor is used to measure vibrations of a vibrating machine, in particular a vibrating screen and a vibrating conveyor, during operation. The vibration sensor detects vibration components of the vibrations of the vibrating machine in three spatial directions of a Cartesian sensor coordinate system. The three vibration components form a vibration vector. In vibration measurement methods, a gravity vector describing the direction of gravity is determined. Furthermore, a machine vector describing a preferred direction of a raised vibration of the vibrating machine is determined. In addition, a three-dimensional Cartesian measurement coordinate system is formed, which is aligned using the gravitational direction and the preferred direction. The vibration vector is mapped from the sensor coordinate system into the measurement coordinate system.

Using the method described here, a vibration sensor can be placed anywhere on a vibrating machine without having to manually measure the orientation of the vibration sensor. This also makes it possible to place vibration sensors in places that are difficult to reach, as attaching them, e.g. using magnets, is usually easier than using an orientation measuring device such as a spirit level to determine the orientation.

Furthermore, the automatic evaluation of the orientation of the vibration sensor is more accurate than a manual measurement, as the manual measurement can only be carried out using the housing of the vibration sensor, whereas the measured values of the vibration sensor itself are used for the automatic measurement.

In addition, the automatic method is significantly faster than a manual measurement, as only a few vibration cycles are required. This means that enough data is collected within a few seconds to reliably determine the orientation of the vibration sensor. With a manual measurement, on the other hand, a user must first reach the sensor and then perform the measurement in relation to the vibrating machine, which takes longer than these few seconds.

The vibration sensor is an acceleration sensor that measures and outputs the acceleration applied to it in three dimensions.

A vibration in the sense of the present invention is a wound-up vibration. This can be generated, for example, with a vibration drive, such as an unbalance motor. The vibration can be one-dimensional, i.e. along one direction, or two-dimensional, i.e. along two directions. So-called elliptical vibration or circular vibration are known here. Vibrations in three directions are also possible.

The entire vibrating machine vibrates in the same direction, driven by the vibration. The method described here makes use of this to define the second vector in addition to gravity in order to obtain the orientation in three-dimensional space.

The machine vector directly or indirectly describes the preferred direction of the vibration.

Direct means that when determining the machine vector, the preferred direction then runs along the one-dimensional vibration direction or, in the case of multi-dimensional vibrations, along the direction with the strongest deflection.

Indirectly means that the machine vector is determined by a mathematical transformation from the preferred direction. For example, the machine vector can be perpendicular to the preferred direction. This is particularly useful if you have a circular vibration in which both directions of vibration are equally pronounced.

In principle, the machine vector points in the preferred direction. However, it is also possible for the machine vector to be a projection of the preferred direction onto a predetermined plane. This plane is, for example, a plane of another transition coordinate system spanned by two axes, which is explained in more detail below using the example embodiment.

The mapping of the measurement coordinate system and the mapping of the vibration into the measurement coordinate system can already begin in parts before the determination of the machine vector or the gravity vector. In this case, the vibration vector is rotated depending on the machine vector or gravity vector already determined.

The gravitational direction, which is described by the gravitational vector, points in the direction of the earth's center of gravity.

By specifying the gravitational vector and the machine vector, there are two vectors that are independent of the orientation of the vibration sensor, which are fixed in relation to the vibrating machine, but can be determined by the vibration sensors.

Two vectors are required to determine the orientation of an object, in this case the vibration sensor, in space. These are given by the gravitational vector and the machine vector.

This method only works if the vibrating machine is in operation. A vibration is only imposed on the vibrating machine during operation, so that a machine vector is then determined.

The gravitational vector may be determined as the time average of the vibrations.

Gravity is the only acceleration force that acts permanently in the same direction on the vibration sensor. The forced vibrations oscillate around a zero value. These forced vibrations therefore average out to zero over time. Time averaging therefore results in a gravitational vector that has the direction of the earth's gravitational force.

A duration of at least one vibration cycle is required for time averaging. However, a few vibration cycles are preferred here. Typically, the values of a few seconds are averaged here in order to also average out harmonic and subharmonic vibrations.

To determine the machine vector, the vibrations are preferably converted into Fourier space using a Fast Fourier Transformation (FFT). The amplitudes of the vibrations of an excitation frequency specified by the vibrating machine determined there form an amplitude vector that points in the preferred direction, whereby the machine vector can be determined.

The vibrating machine vibrates at an excitation frequency specified by the vibration. This is usually adjustable and is specified by the vibration drive.

If the vibrations are converted into Fourier space using the FFT, there are three amplitude values at the position of the excitation frequency, one for each spatial direction of the sensor coordinate system. These three amplitudes represent a vector that comprises the sum of all vectors in which the vibration is performed. If the vibration is one-dimensional, this amplitude vector corresponds to the vibration vector. If the vibration is two-dimensional and elliptical, the amplitude vector is the addition of the vibration vector along the major axis and the vibration vector along the minor axis of the elliptical vibration.

The amplitude vector has a fixed predetermined reference to the preferred direction.

This fixed reference can be designed in such a way that the amplitude vector is set equal to the preferred direction.

Alternatively, this fixed reference can also include a rotation. Such a rotation, which is fixed, means that the determined amplitude vector is rotated in a certain way. This can, for example, be such that the vector is rotated by 90° along an axis or is mirrored or mapped onto a predefined axis.

The fixed reference can also be given by the fact that the machine vector is a mapping of the amplitude vector to a predetermined plane. This can be done, for example, by replacing one of the vector elements, such as that for the z-axis, with zero.

A first axis of the measurement coordinate system may run parallel or antiparallel to the gravity vector.

This first axis is usually the z-axis and generally describes the height.

A second axis of the measurement coordinate system may run along a portion of the machine vector that is orthogonal to the first axis.

It is not usually the case that the machine vector is perpendicular to the gravity vector. Both vectors can therefore not easily span an orthogonal coordinate system. Therefore, only the part of the machine vector orthogonal to the first axis is selected here to form the second axis of the measurement coordinate system.

In an alternative embodiment, the steps can also be reversed so that the first axis of the measurement coordinate system runs parallel or antiparallel to the machine vector and the second axis of the measurement coordinate system runs along the portion of the gravity vector orthogonal to the first axis. Preferably, the position of the vibration sensors is determined by a radio positioning system, in particular a satellite positioning system, such as a global positioning system (e.g. GPS, GLONASS, Galileo, Beidou). The radio positioning system can also be a mobile radio network, whereby the sensor exchanges bearing signals with the nearest neighboring transmitters of the mobile radio network.

This makes it particularly easy to transfer the vibration sensors to the corresponding coordinate system without having to determine the position manually. It also makes it easier to determine the distances between the sensors.

Time stamps are added to the measurement of the vibrations at regular intervals.

These time stamps can be relative, for example by indicating the microseconds that have elapsed since the last full hour, or absolute, representing the absolute time. These time stamps are contained in the vibration signals. So that the sensors can provide absolute time stamps, they have a clock that can be synchronized with an external clock.

The inaccuracy of the clock is not greater than 400 μs, preferably 200 μs and in particular 100 μs.

Several vibration sensors are aligned.

If several vibration sensors are aligned, the measured vibrations are also aligned and are related to each other. This makes it possible to analyze the measured vibrations in relation to each other.

For example, it is possible to measure deformations of the vibrating machine by subtracting the measured vibrations of two aligned vibration sensors from each other.

The spatial assignment of the vibration sensors to each other is retained during alignment. This means that two vibration sensors that were originally at a certain distance from each other maintain this distance even after alignment. Two vibration sensors that are 3 m apart are also 3 m apart after alignment. These distances are predetermined.

The predetermined sensor spacing allows deformations between two vibration sensors to be displayed in absolute terms. It therefore makes a difference whether the deformation with an amplitude of 2 mm is 5 cm or 5 m between the sensors.

The distance also makes it possible to display the deformation or vibrations in relation to the dimensions of the vibrating machine.

One of the vibration sensors may be selected as the reference vibration sensor and the reference vibration sensor defines the origin of a deformation coordinate system.

The deformation coordinate system thus oscillates relative to the surrounding space. However, if the vibration sensors are viewed in this deformation coordinate system, the translational movement is eliminated and the movements displayed in the deformation coordinate system represent a deformation.

All relative vibration signals may be calculated in relation to the reference vibration sensor.

This makes it possible to track a change in a deformation originating from the reference vibration sensor. For example, it may be that a deformation in the area around the reference vibration sensor corresponds more to an elongation and then corresponds more to a twisting in the area further away.

The reference vibration sensor can be arranged as close as possible to the vibration source.

The vibration source is usually a vibration motor.

As close as possible in this context means that the reference vibration sensor is arranged no further than 50 cm, preferably no further than 25 cm and in particular no further than 10 cm from the vibration source.

The vibration source is the main reason why deformation can occur in the vibrating machine. Furthermore, the strongest vibrations occur at the vibration source. If these are subtracted out by positioning the reference vibration sensor as close as possible, the deformation of the vibrating machine caused by the vibration can be tracked.

If more than two vibration sensors are used, such can span a surface or a space.

If a space is spanned, a deformation can also be determined in all three spatial axes. If only a surface or a line is spanned, deformations can only be determined within the surface or along the line.

A system for determining the alignment of a vibration sensor on a vibrating machine or a vibrating conveyor during operation is designed to carry out the method described above.

The system comprises at least one vibration sensor and an evaluation unit.

BRIEF DESCRIPTION OF THE DRAWINGS

The invention is explained in more detail below with reference to the examples shown in the drawings. The drawings show schematically in.

DETAILED DESCRIPTION

Figure 1:
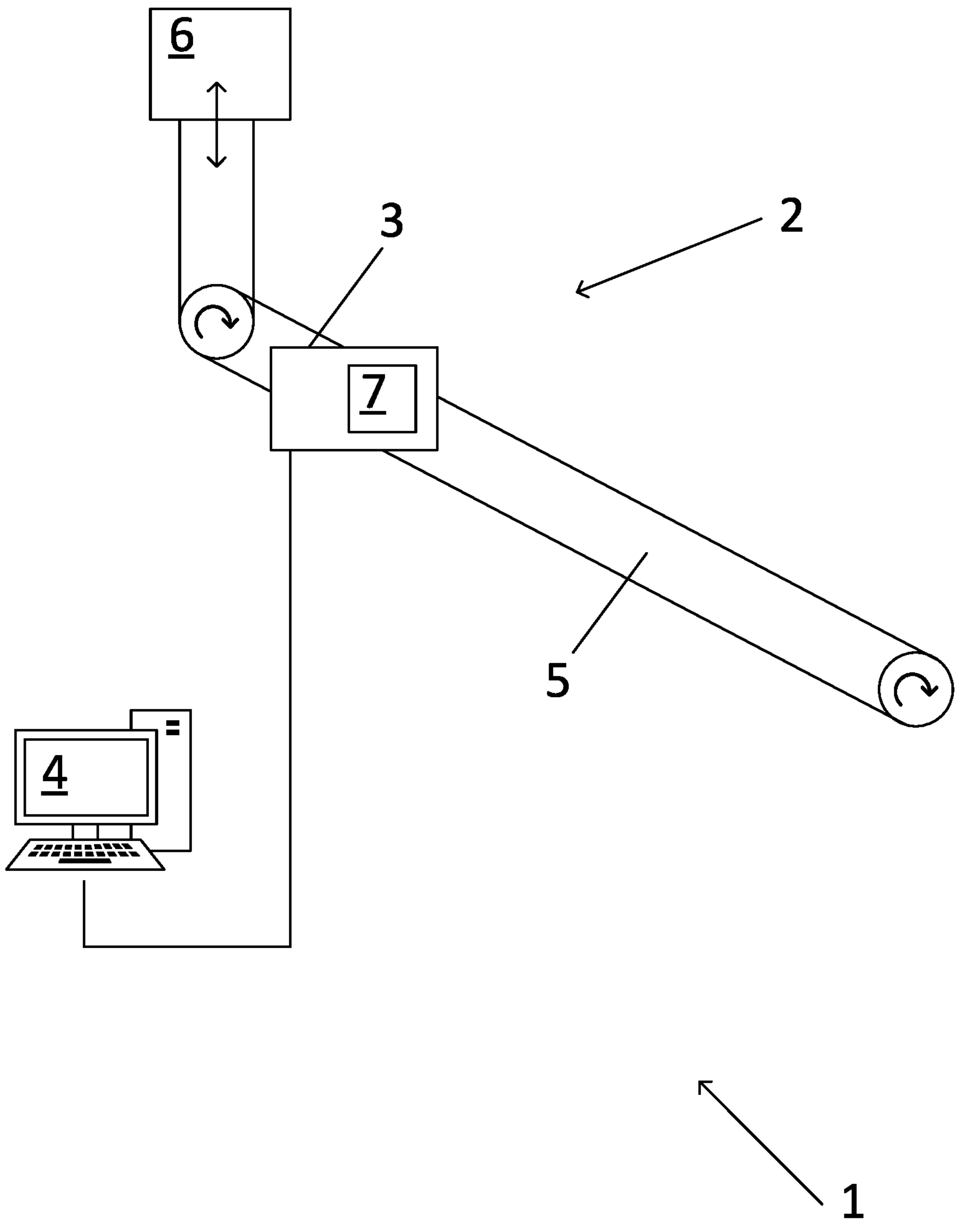
FIG. 1 is a side view of a vibrating machine with a vibration sensor and an evaluation unit.

An embodiment example of a system for resonance analysis of a vibrating machine 1 includes a vibration conveyor 2, a vibration detection device 3 and an evaluation device 4 (see FIG. 1).

The vibrating conveyor 2 is designed for conveying bulk material, e.g. castings. However, any other applications are also possible. The vibratory conveyor 2 includes a vibratory conveyor trough 5 with side walls 8 and a vibration drive 6.

The vibrating conveyor trough 5 is designed with a conveyor floor (not shown), which is arranged in a vibrating frame. The conveyor floor transports the bulk material. A vibration drive 6 is connected to the vibrating frame and sets it in vibrating motion.

The vibration drive 6 is aligned at a predetermined angle to the conveyor floor (not shown) and causes it to oscillate in a predetermined direction.

The vibration drive 6 can be adjusted with regard to the vibration frequency.

The vibration drive is arranged at a predetermined angle $\alpha$ to the vibratory conveyor trough 5.

The vibrating conveyor trough 5 is aligned at a predetermined angle $\beta$ with respect to gravity.

The conveying behavior can be influenced by adjusting the angle $\alpha$, $\beta$ and/or the frequency.

The vibration drive 6 includes an unbalance motor, which in this embodiment example is a three-phase motor that has a radius-adjustable unbalance weight (not shown) at one end of the shaft. The amplitude of the generated vibration can be changed by manually adjusting the unbalance. The frequency is determined by the speed of the motor.

In this design example, two counter-rotating drives are used. A single motor would generate a circular motion and not a linear vibration.

Figure 2:
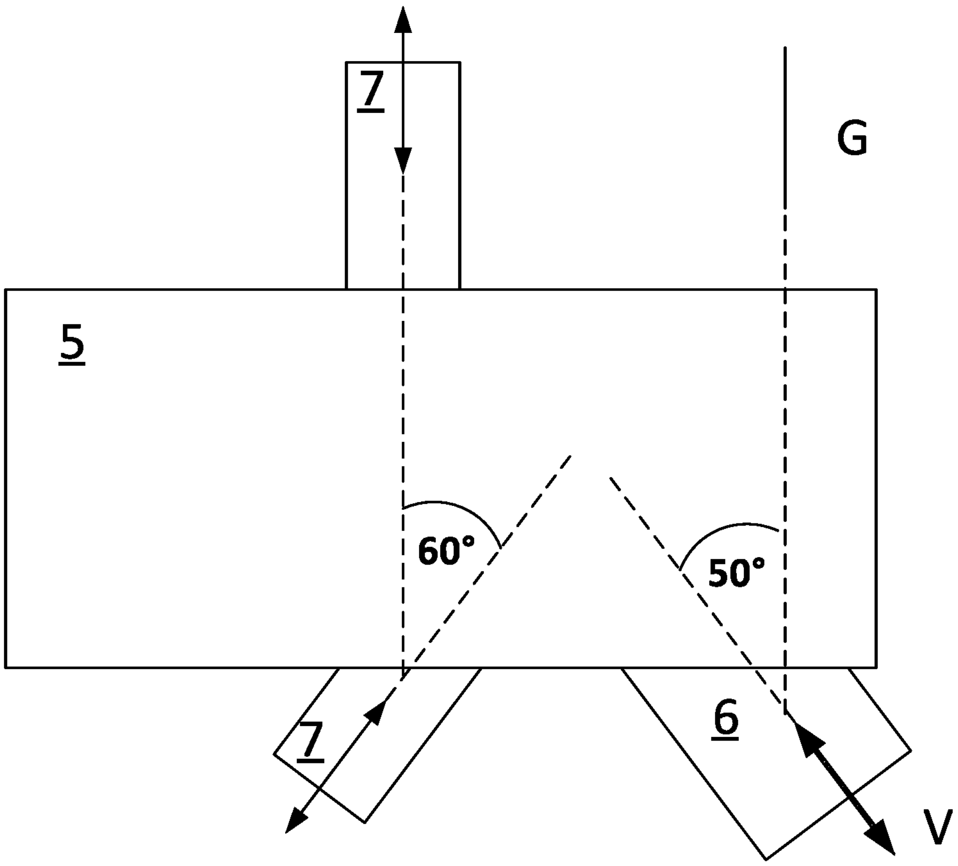
FIG. 2 is a side view of a vibrating conveyor trough with attached vibration sensors and vibration drive.

The vibration detection device 3 has at least one vibration sensor 7. The vibration sensor 7 is an acceleration sensor that measures vibrations of the vibrating conveyor 2 in all three spatial axes. For this purpose, each vibration sensor 7 measures the vibration along three sensor axes, which is specified by the vibration sensor 7. The sensor axes are recorded on the vibration sensors 7. The sensor axes are permanently linked to the orientation of the vibration sensor 7. If the vibration sensor 7 rotates, the sensor axes also rotate. The vibration sensor 7 and the vibration drive 6 have a specific angle to the vibrating conveyor trough 5 (FIG. 2).

The vibration sensor 7 is connected to the evaluation unit 4 via a radio link. In principle, wired connections are also possible.

The vibration sensor 7 is designed as a so-called "Micro-Electro-Mechanical Systems" (MEMS).

The connection between the vibration detection device 3 and the evaluation device 4 can be made via radio, for example Bluetooth, WLAN, ZigBee, Z-Wave or via a mobile phone network, or can be cable-based, e.g. via a LAN network.

The vibration sensor 7 is connected to the vibrating conveyor 2 via a mounting device. This connection can be fixed (e.g. using screws) or detachable (e.g. using adhesive strips or a clamping mechanism).

The evaluation device 4 can be designed as a computer, conventional smartphone or tablet. The evaluation device has a receiver module to receive the data from the vibration sensor 7. The evaluation device 4 processes the data from the vibration sensor 7 using an additional software application, also known as an app.

The evaluation device 4 can also include a display device that visually outputs the recorded and processed data.

Figure 5:
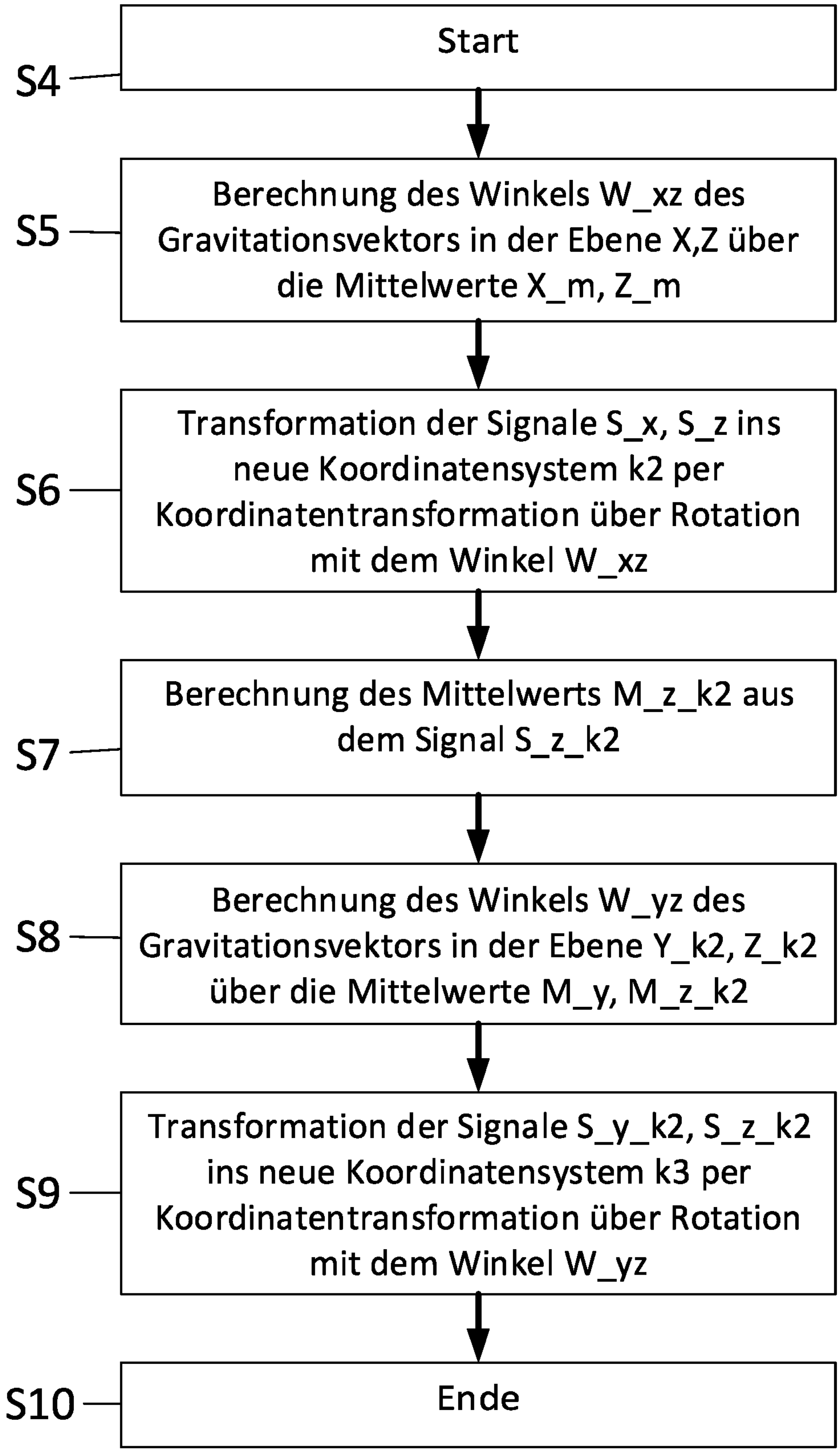
FIG. 5 illustrates a method of rotating the vibration vector in relation to the gravitational vector in a flow chart.

The method for determining the alignment of a vibration sensor on a vibrating machine is explained below (FIG. 5).

Figure 4:
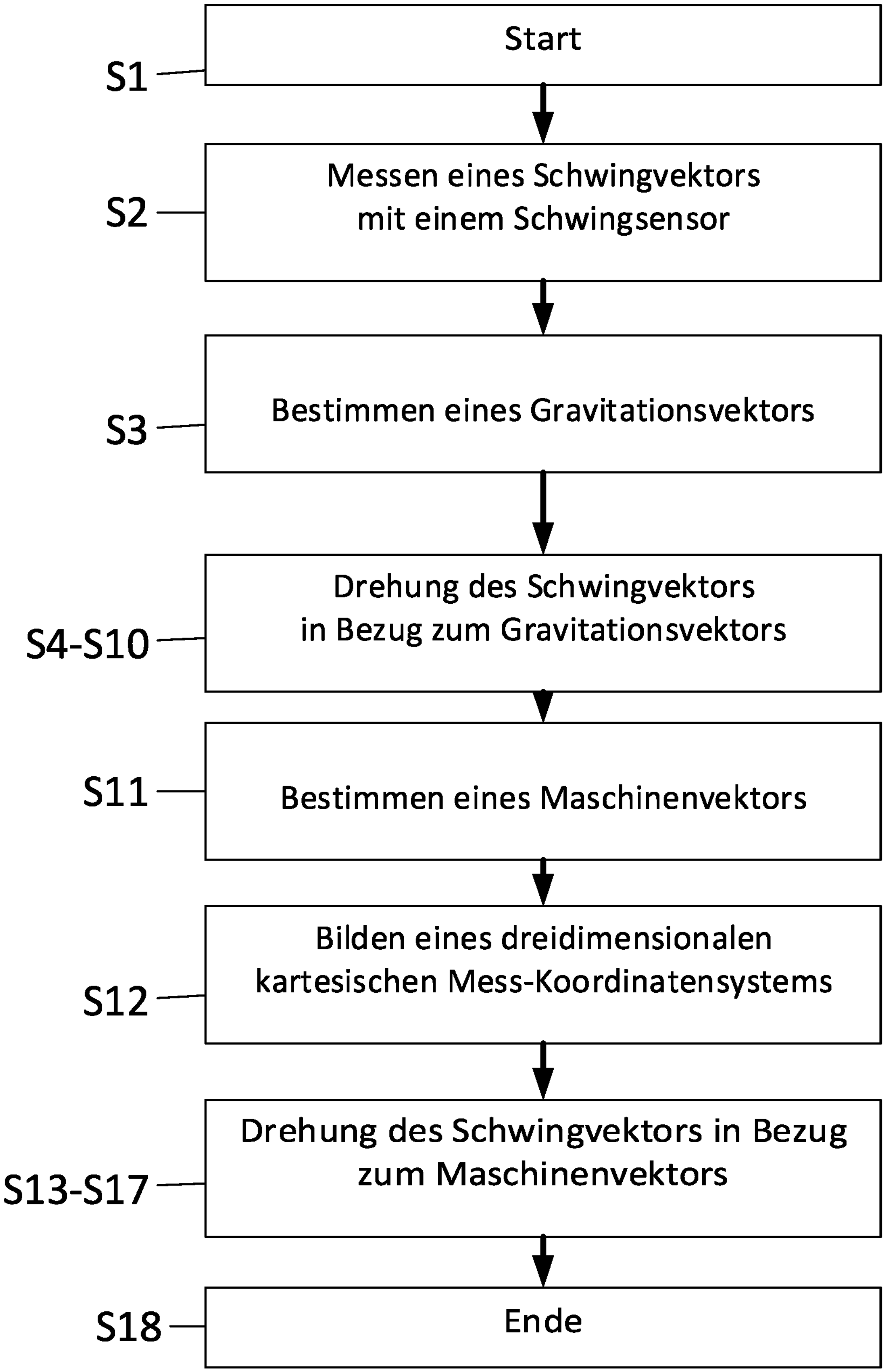
FIG. 4 illustrates a method for measuring vibrations of a vibrating machine in a flow chart.

The method for measuring vibrations of a vibrating machine is explained below (FIG. 4). The procedure begins with step S1.

In the next step (S2), a vibration vector S=(S_x, S_y, S_z) is measured with the vibration sensor 7. The vibration vector S is located in the sensor coordinate system k1.

Figure 3:
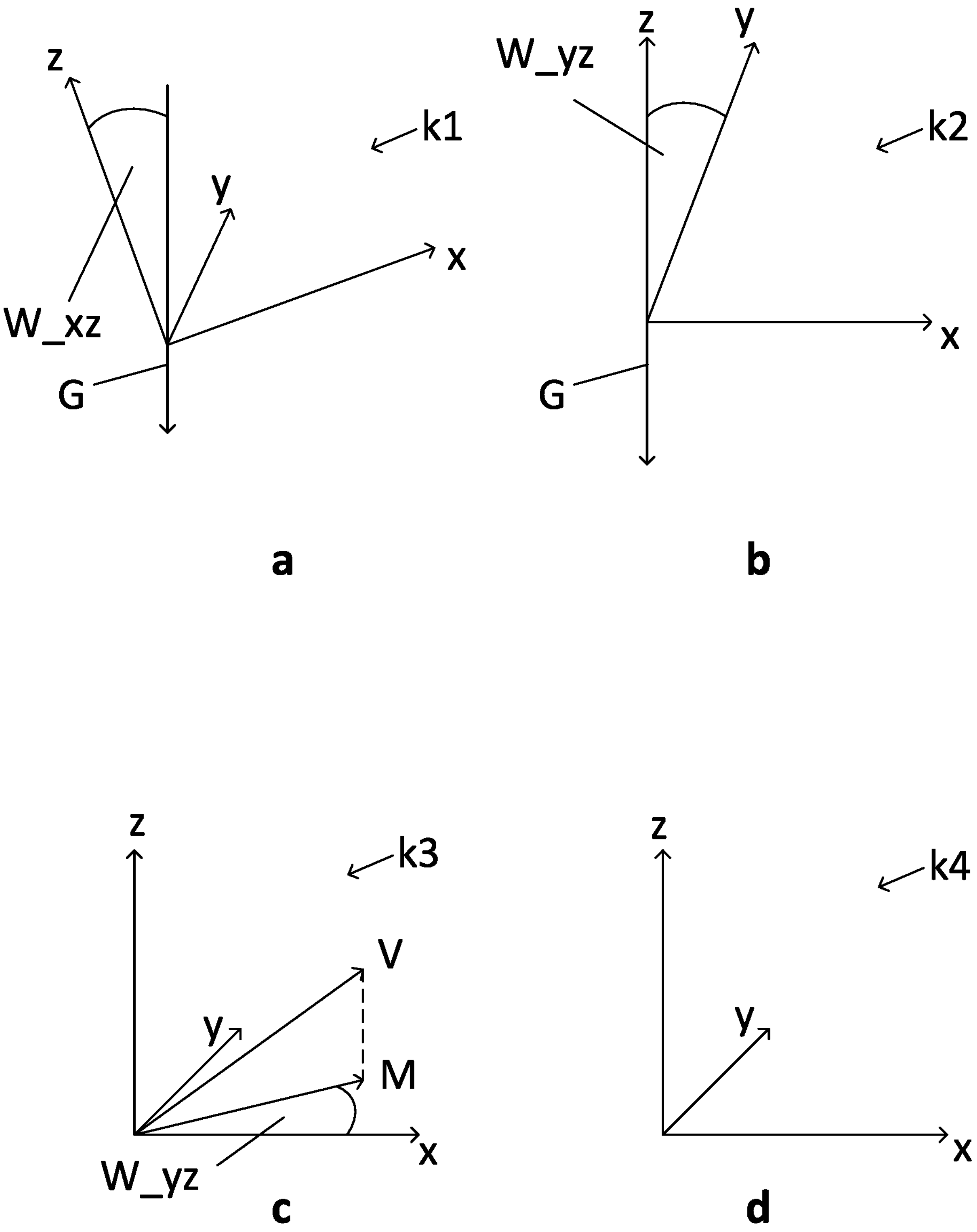
FIG. 3 illustrates different coordinate systems in relation to the gravitational force and the direction of vibration.

A gravity vector G is then determined (step S3). For this purpose, an average vector (M_x, M_y, M_z) is formed from the vibration sensor (S_x, S_y, S_z). The mean value vector forms the gravity vector G in the coordinate system k1 (FIG. 3*a*).

To form the mean value, the time average of a few seconds, typically 2 to 60 seconds, is formed. However, it is not detrimental to the procedure to select longer intervals. At least 10 times the inverse of the excitation frequency should be selected in order to be able to carry out a reasonable Fourier transformation later.

In the following steps S4-S10, the vibration vector S is rotated in relation to the gravitational vector G.

The rotation begins with step S4 (FIG. 5). This is followed by step S5, in which an angle W_xz of the gravitational vector G in the xz plane is calculated. The angle W_xz is calculated using the mean values M_x and M_z with an arctangent function.

In the following step (S6), the vibration components S_x, S_y, S_z of the vibration vector S are transformed into a new coordinate system k2, which is a transition coordinate system, by coordinate transformation via rotation with the angle W_xz. Here, S_y_k2=S_y.

Then, in step S7, an average value M_z_k2 is calculated from the transformed vibration component S_z_k2 of the transformed vibration vector S_k2.

The angle W_yz of the gravitational vector G in the Y_k2, Z_k2 plane is then calculated (step S8) (FIG. 3*b*). The angle W_yz is calculated using the mean values M_y, M_z_k2 with an arctangent function.

In the next step (S9), the vibration components S_y_k2 and S_z_k2 of a transformed vibration vector S_k2 are transformed into a new coordinate system k3, which is a transition coordinate system, by coordinate transformation via rotation with the angle W_yz. Here, S_x_k3=S_x_k2. The rotation of the vibration vector S in relation to the gravity vector ends with step S10.

The machine vector is then formed in step S11 (FIG. 4). For this purpose, an amplitude vector A with the components A_x, A_y and A_z is calculated. The amplitude vector A is determined by transforming the transformed vibration components S_x_k3, S_y_k3, S_z_k3 into Fourier space using a Fast Fourier Transform (FFT). The amplitudes A_x, A_y and A_z are then determined in the Fourier spectrum of the individual vibration components at the operating frequency of the vibratory drive 6. The amplitude vector A runs along a preferred direction.

The machine vector M is given by (A_x, A_y, 0) This is the projection of the amplitude vector A onto the XY plane of the coordinate system k3 (FIG. 3*c*).

In the following step S12, a three-dimensional Cartesian measurement coordinate system k4 is formed. The Z-axis of k4 points in the opposite direction of the gravity vector G. The X-axis of the measurement coordinate system runs along the machine vector M.

Figure 6:
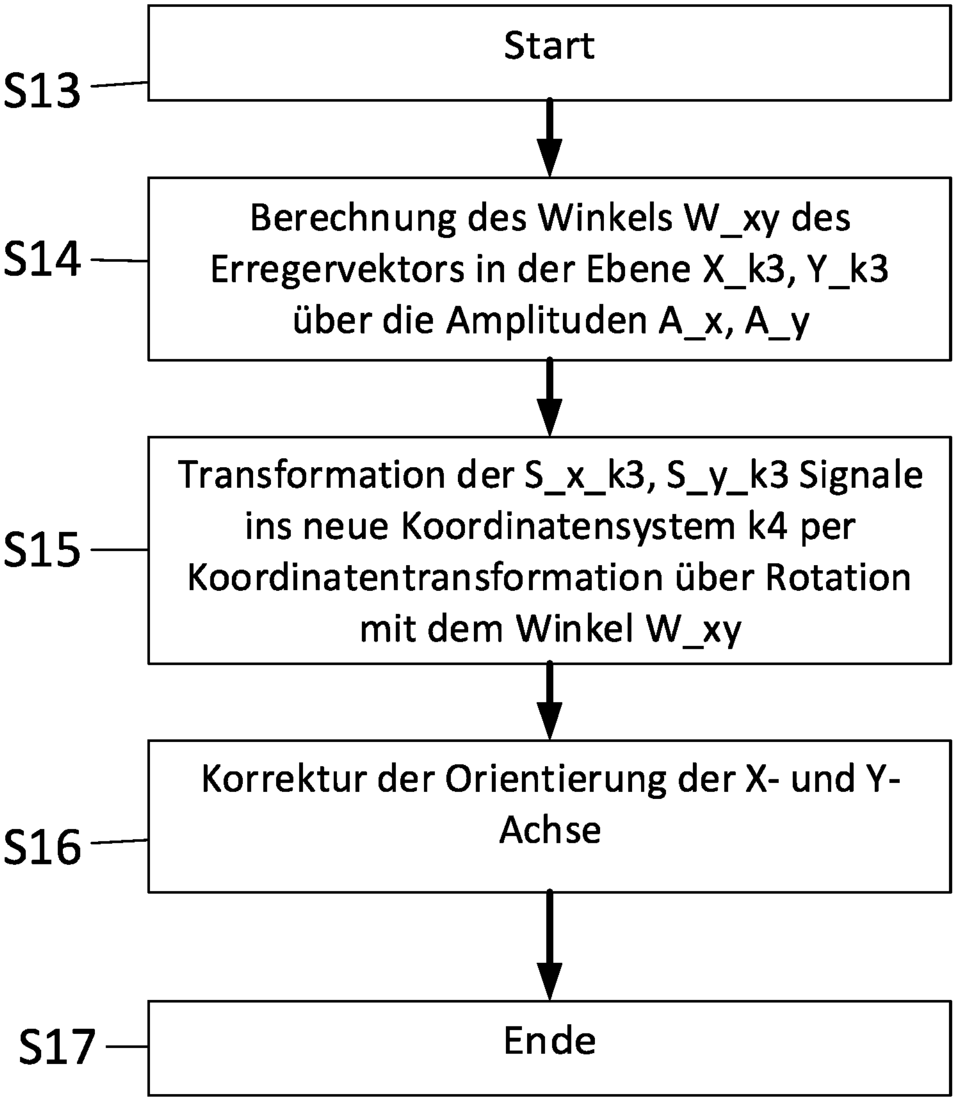
FIG. 6 illustrates a method of rotating the vibration vector in relation to the machine vector in a flow chart.

In steps S13-S17, the transformed vibration vector S_k3 is rotated in relation to the machine vector M (FIG. 6).

The rotation begins with step S13. In the next step (S14), the angle W_xy of the machine vector M in the X_k3, Y_k3 plane is calculated via its components A_x and A_y using an arctangent function.

Then, in step S15, the transformed vibration components S_x_k3 and S_y_k3 are transformed into the measurement coordinate system k4 by coordinate transformation via rotation with the angle W_xy. Here, S_z_k4=S_z_k3.

Step S16 follows, in which the orientation of the X and Y axes is corrected. At this point, it is still unknown whether the X_k4 axis and the Y_k4 axis span a right-handed or left-handed coordinate system. This can be calculated using the phase difference between the components of the machine vector A_x and A_z. If a left-handed coordinate system is present, this can be corrected by changing the sign of the X or Y axis.

The rotation is completed with step S17. This also ends the mapping of the vibration vector S from the sensor coordinate system k1 to the measurement coordinate system k4 (S18).

The rotations in steps S4-S10 and S13-S17 correspond to the mapping into the measurement coordinate system.

In an alternative embodiment, the vibration signals S_x, S_y, S_z are rounded to an integer number of periods of the excitation frequency. This improves the mean value calculation for determining the gravitational vector G.

The invention claimed is:

1. A method for measuring vibrations of a vibrating machine, in particular a vibrating screen or a vibrating conveyor, during operation, in which the vibrating machine vibrates at an excitation frequency predetermined by a vibrating drive, wherein a vibration sensor detects a plurality of vibration components of vibrations of the vibrating machine in three spatial directions of a Cartesian sensor coordinate system, and wherein the plurality of vibration components form a vibration vector, the method comprising the steps of:

determining a gravitational vector which describes a gravitational direction, the gravitational vector being determined as a time average of the vibrations of the vibrating machine detected by the vibration sensor, signals of the vibrations being rounded to an integer number of periods of the excitation frequency;

determining a machine vector which describes a preferred direction of an imposed vibration of the vibrating machine, the vibrations being converted into Fourier space by a Fast Fourier transform in order to determine the machine vector, and wherein amplitudes of the vibrations of an excitation frequency specified by the vibrating machine determined forming an amplitude vector which points in the preferred direction;

forming a three-dimensional Cartesian measurement coordinate system which is aligned on a basis of the gravitational direction and the preferred direction, wherein a first axis of the measurement coordinate system extends parallel or antiparallel to the gravitational vector and a second axis of the measurement coordinate system extends along a portion of the machine vector which is orthogonal to the first axis, or a first axis of the measurement coordinate system extends parallel or antiparallel to the machine vector and the second axis of the measurement coordinate system extends along the portion of the gravitational vector which is orthogonal to the first axis; and mapping the vibration vector from the Cartesian sensor coordinate system into the measurement coordinate system.

2. The method according to claim 1, wherein a position of the vibration sensor is determined by a global positioning system.

3. The method according to claim 1, wherein time stamps are added to the measurement of the vibrations at regular intervals.

4. The method according to claim 1, wherein several vibration sensors are aligned.

5. The method according to claim 4, wherein spatial assignment of the vibration sensors to one another is retained during the alignment.

6. The method according to claim 4, wherein one of the vibration sensors is selected as a reference vibration sensor and the reference vibration sensor defines an origin of the measurement coordinate system.

7. The method according to claim 6, wherein all vibration signals are calculated with respect to the reference vibration sensor.

8. The method according to one of claim 6, wherein the reference vibration sensor is arranged as close as possible to and no further than 50 cm from the vibration drive.

9. The method according to claim 6, wherein, if more than two vibration sensors are used, the sensors span a surface or a space.

10. A system for determining alignment of a vibration sensor on a vibrating machine or a vibrating conveyor during operation, arranged to carry out a method according to claim 1, wherein the system includes at least one vibration sensor and an evaluation unit.

* * * * *